F. ZALESKI.
CLUTCH.
APPLICATION FILED JULY 14, 1916.
1,251,611.
Patented Jan. 1, 1918.
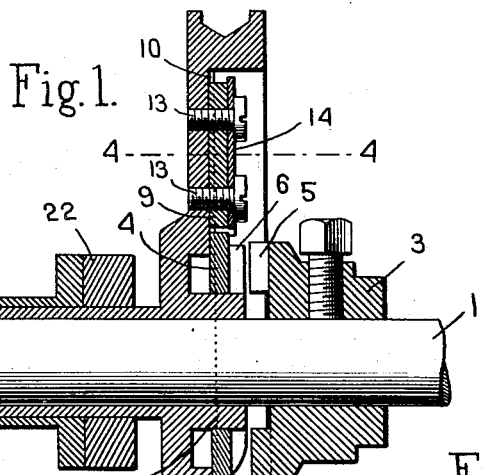
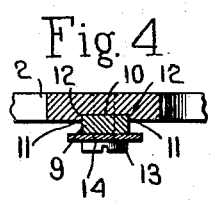
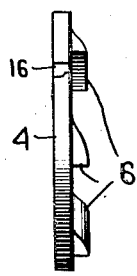
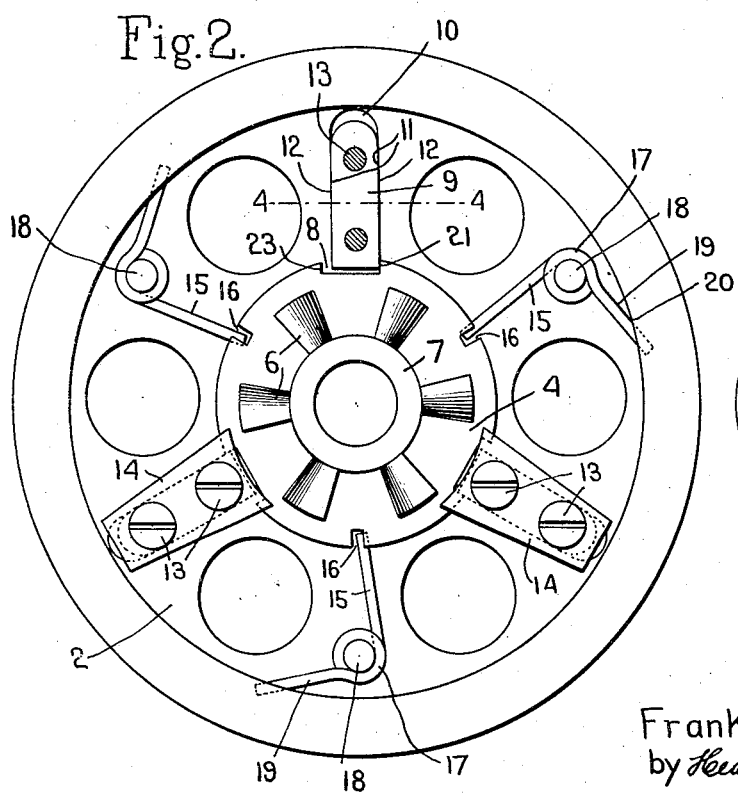
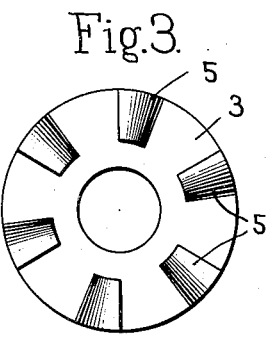
Inventor.
Frank Zaleski
by Heard Smith & Tennant.
Attys.

UNITED STATES PATENT OFFICE.

FRANK ZALESKI, OF SOMERVILLE, MASSACHUSETTS, ASSIGNOR TO THE REECE BUTTON HOLE MACHINE COMPANY, OF BOSTON, MASSACHUSETTS, A CORPORATION OF MAINE.

CLUTCH.

1,251,611.  Specification of Letters Patent.  Patented Jan. 1, 1918.

Application filed July 14, 1916. Serial No. 109,369.

*To all whom it may concern:*

Be it known that I, FRANK ZALESKI, a subject of the Emperor of Germany, residing at Somerville, county of Middlesex, State of Massachusetts, have invented an Improvement in Clutches, of which the following description, in connection with the accompanying drawing, is a specification, like characters on the drawing representing like parts.

This invention relates to clutches of that type in which one of the clutch elements is yieldingly sustained so that when the clutch elements are thrown into clutching engagement, said clutch element can yield slightly, thus preventing any sudden jar due to the clutch members positively interlocking while one member is rapidly rotating.

The object of the invention is to provide an improved clutch of this type which is simple in construction and easily manufactured and which has other advantages, all as will be more fully hereinafter set forth.

In order to give an understanding of my invention I have illustrated in the drawings a selected embodiment thereof which will now be described, after which the novel features will be pointed out in the appended claims.

Figure 1 of the drawing is a vertical sectional view through a clutch embodying my invention;

Fig. 2 is a face view of the driving element with the associated driving clutch member;

Fig. 3 is a face view of the driving element;

Fig. 4 is a section on the line 4—4, Fig. 1, or 4—4, Fig. 2;

Fig. 5 is an edge view of the driving clutch member 4.

I have herein illustrated my invention as it might be used for driving a shaft 1 from a driving element in the form of a driving pulley 2, although the invention is capable of use generally wherever a clutch is desired.

The shaft 1 is shown as having fast thereto a driven clutch element 3 and the driving pulley 2 has associated therewith a driving clutch element 4. These clutch elements are illustrated as of the positive clutch type, that is, each clutch element has clutch projections adapted to engage those on the other clutch element, thus making a positive clutch. The clutch projections on the driven clutch 3 are shown at 5 and those on the driving clutch 4 are shown at 6, these clutch elements being constructed to interlock with each other as usual in clutches of this type.

The clutch element 4 is yieldingly sustained so that it can have a slight rotative movement against the action of springs relative to the driving member 2. As a result, when the two clutch elements are thrown into clutching engagement at a time when the driving element 2 is rapidly rotating, the yielding movement of the clutch element 4 will permit the shaft 1 to be started without any jar or shock, such as would be occasioned if the clutch element 4 had no yielding movement. The driving element 2 is shown as provided with a hub 7 on which the clutch element 4 is mounted. This clutch element 4 is provided in its periphery with notches 8 in which are received the ends of stop members 9 in the form of plates that are secured to the driving element 2. There are three such stop plates 9 illustrated, although any number may be used. The driving element 2 is formed in its face with recesses 10 in which the stop members 9 are received, the edges 11 of the stop members fitting against the walls 12 of the recesses. These stop projections are shown as held in place by screws 13 which pass therethrough and are screwed into the driving element 2. 14 is a cover plate which overlies each stop projection and which is also held in place by the screws 13. The recesses 8 in the periphery of the clutch member 4 are of such dimensions as to permit said clutch member to have a slight turning movement on the hub 7, as clearly seen in Fig. 2. The clutch member 4 is acted upon by spring arms 15 which are radially arranged, and the inner ends of which are received in recesses or notches 16 formed in the periphery of the clutch member 4. These spring arms may be formed in any suitable way. Each one is herein illustrated as being constituted by the end of a spring wire 17 which is coiled about a stud 18 carried by the driving element 2, the other end 19 of the spring resting against the annular wall 20 which is formed on the driving element. There are three such spring arms illustrated in the drawings and they tend normally to hold the clutch element 4 in the position shown in Fig. 2 with the wall 21 of each recess 8 against the inner end of the corresponding stop projection 9. The clutch is thrown into engagement or disengaged by movement of the driving member 2 longitudinally of the shaft 1, and for this purpose said driving member has a clutch collar 22 thereon which coöperates with any suitable clutch-actuating lever in usual manner. When the clutch is thrown into engagement while the driving element 2 is rotating the driving clutch member 4 will yield slightly as the load comes thereon, thus giving a yielding or cushioning movement to the driven element. The extent of this yielding movement is determined by the proportion or size of the notches 8. When the clutch element 4 has yielded sufficiently to bring the end 23 of each notch against its stop projection, then the rotative motion of the driving element 2 will be communicated positively to the driven clutch member. The size of the notches 8 will be varied, depending on the amount of yielding movement desired.

It will be noted that when the clutch is in operation, the driving force of the driving element 2 is communicated to the driving clutch member 4 through the stop projections 9, and the advantage of placing said stop projections in the recess 10 is that such driving force will be communicated through the wall 12 of the recess, thus taking the strain off from the screws 13.

The construction of the spring arms 15 is such that they are not liable to become broken by any ordinary usage, but at the same time they furnish all necessary yielding movement to the driving clutch element 4.

I claim:

1. In a clutch, the combination with a rotatable driving element, of a clutch member situated co-axially thereof and capable of turning movement relative thereto, a plurality of radially-extending spring arms secured to the driving element and engaging the clutch element, said spring arms resisting the turning movement of said clutch element in one direction, means to limit the turning movement of the clutch member relative to the driving element and a driven clutch member adapted to be clutched to the driving clutch member.

2. In a clutch, the combination with a rotatable driving element having a hub, of a driving clutch member loosely mounted on said hub, a plurality of radially-extending spring arms secured to the driving element and engaging the driving clutch member, said spring arms resisting the turning movement of said driving clutch member in one direction, means to limit the turning movement of the clutch member relative to the driving element, and a driven clutch member adapted to be clutched to the driving member.

3. In a clutch, the combination with a rotatable driving element having a hub, of a driving clutch member loosely mounted on said hub, said driving clutch member having recesses in its periphery, a plurality of radially-extending spring arms carried by the driving element and having their ends situated in said recesses, means to limit the rotative movement of the driving clutch member relative to the driving element, and a driven clutch member adapted to be clutched to the driving clutch member.

4. In a clutch, the combination with a rotatable driving element having a hub, of a driving clutch member loosely mounted on said hub and provided with recesses in its periphery, radially-extending stop projections carried by the driving element and having their inner ends occupying said recesses, said recesses being larger than the stop projections to permit a limited rotative movement of said clutch member, springs acting on the clutch member and tending to rotate the latter in one direction relative to the driving element, and a coöperating clutch member adapted to be clutched to the driving clutch member.

5. In a clutch, the combination with a rotatable driving element having a hub, of a driving clutch member loosely mounted on said hub and provided with two sets of recesses in its periphery, radially-extending stop projections carried by the driving element and having their inner ends occupying the recesses of one set, said recesses being larger than the stop projections to permit a limited rotative movement of the clutch member on the hub, radially-extending springs secured to the driving element and having their inner ends received in the recesses of the other set, said springs tending to rotate said clutch member in one direction relative to the driving element, and a coöperating clutch member adapted to be clutched to the driving clutch member.

6. In a clutch, the combination with a rotatable driving element having a hub, of a driving clutch member loosely mounted on said hub and provided with recesses in its periphery, radially-extending stop projections carried by the driving element and having their inner ends occupying said recesses, said recesses being larger than the stop projections to permit a limited rotative movement of said clutch member relative to the hub, radially-extending spring arms secured to the driving element and acting on said driving clutch member, said spring arms tending to rotate said clutch member in one direction relative to the driving element, and a driven clutch member adapted to be clutched to the driving clutch member.

In testimony whereof I have signed my name to this specification.

FRANK ZALESKI.